(12) United States Patent
Hanzaki et al.

(10) Patent No.: US 12,109,976 B2
(45) Date of Patent: Oct. 8, 2024

(54) VEHICULAR APPARATUS, VEHICULAR SYSTEM, AND USER AUTHENTICATION MANAGEMENT PROGRAM PRODUCT

(71) Applicant: DENSO CORPORATION, Kariya (JP)

(72) Inventors: Makiko Hanzaki, Kariya (JP); Yuka Itou, Kariya (JP); Yuusuke Tanaka, Kariya (JP); Hajime Nomura, Kariya (JP); Takanari Makita, Kariya (JP)

(73) Assignee: DENSO CORPORATION, Kariya (JP)

( * ) Notice: Subject to any disclaimer, the term of this patent is extended or adjusted under 35 U.S.C. 154(b) by 461 days.

(21) Appl. No.: 17/367,672

(22) Filed: Jul. 6, 2021

(65) Prior Publication Data

US 2022/0097650 A1    Mar. 31, 2022

(30) Foreign Application Priority Data

Sep. 30, 2020   (JP) .................................. 2020-165364

(51) Int. Cl.
| | |
|---|---|
| *B60R 25/24* | (2013.01) |
| *B60R 25/102* | (2013.01) |
| *B60R 25/32* | (2013.01) |
| *G07C 5/08* | (2006.01) |
| *H04W 4/48* | (2018.01) |
| *H04W 12/06* | (2021.01) |

(52) U.S. Cl.
CPC ............ *B60R 25/24* (2013.01); *B60R 25/102* (2013.01); *B60R 25/32* (2013.01); *G07C 5/0808* (2013.01); *H04W 4/48* (2018.02); *H04W 12/06* (2013.01); *B60R 2325/20* (2013.01)

(58) Field of Classification Search
CPC ....... B60R 25/24; B60R 25/102; B60R 25/32; B60R 2325/20; B60R 25/241; G07C 5/0808; G07C 9/257; G07C 2009/00507; G07C 9/00309; G07C 9/00563; H04W 4/48; H04W 12/06; H04W 12/062; B60K 2370/152; B60K 2370/197; B60K 35/00
See application file for complete search history.

(56) References Cited

U.S. PATENT DOCUMENTS

2002/0133716 A1* 9/2002 Harif ........................ G07C 9/27
726/9
2015/0210287 A1* 7/2015 Penilla .................. B60W 40/08
701/49

(Continued)

FOREIGN PATENT DOCUMENTS

| JP | 2008-197767 A | 8/2008 |
| JP | 2011-231567 A | 11/2011 |

(Continued)

*Primary Examiner* — Ian Jen
*Assistant Examiner* — Renee LaRose
(74) *Attorney, Agent, or Firm* — Harness, Dickey & Pierce, P.L.C.

(57) ABSTRACT

A vehicular apparatus is configured to authenticate a user of a vehicle. In response to authenticating the user, a user management table, which manages an association between the user and a permitted or prohibited operation of the user for each vehicle scene, is referred to, and the permitted or prohibited operation of the user authenticated is specified to provide a specified result. An application corresponding to the permitted or prohibited operation of the user is notified of the specified result to manage the operation of the user.

12 Claims, 11 Drawing Sheets

(56) References Cited

U.S. PATENT DOCUMENTS

| | | | |
|---|---|---|---|
| 2015/0339467 A1 | 11/2015 | Morita et al. | |
| 2015/0363986 A1* | 12/2015 | Hoyos | G07C 9/00571 |
| | | | 340/5.61 |
| 2016/0078208 A1 | 3/2016 | Namiki et al. | |
| 2018/0097804 A1* | 4/2018 | Boehm | G06Q 20/145 |
| 2018/0118164 A1* | 5/2018 | Wood | H04W 4/024 |
| 2018/0164798 A1* | 6/2018 | Poeppel | B60R 25/24 |
| 2019/0050820 A1* | 2/2019 | Atsumi | G07B 15/00 |

FOREIGN PATENT DOCUMENTS

| | | |
|---|---|---|
| JP | 2016-018356 A | 2/2016 |
| JP | 2016-057949 A | 4/2016 |

\* cited by examiner

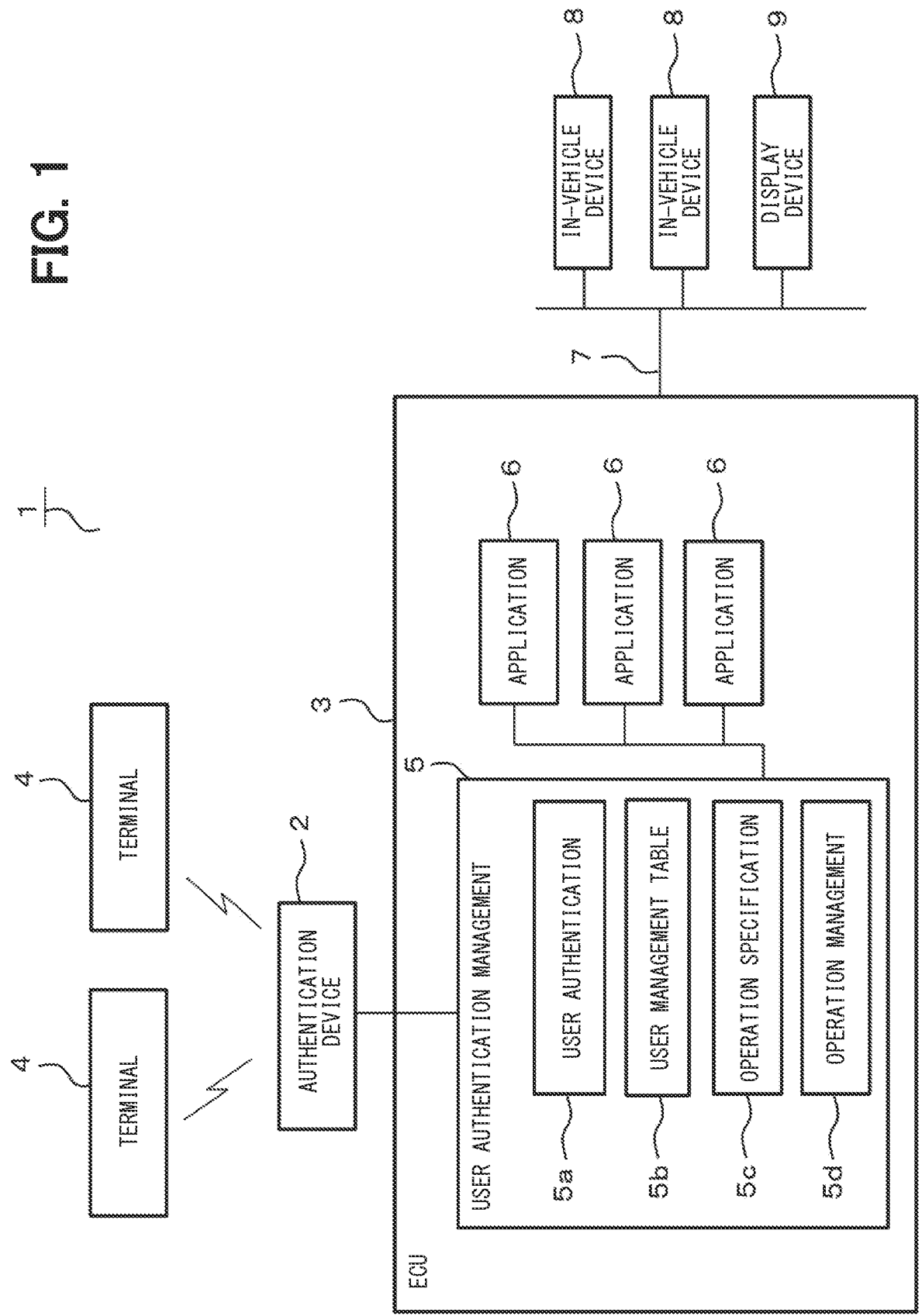

FIG. 2

| DRIVING SCENE (OWNER: DRIVER, OWNER'S FAMILY: PASSENGER) | |
|---|---|
| USER | PERMITTED OPERATION |
| OWNER | (1) ADD USER<br>(2) CHANGE VEHICLE SCENE<br>(3) ADD/DELETE DELIVERED APPLICATION<br>(4) LOCK/UNLOCK DOOR, OPEN/CLOSE SLIDING DOOR<br>(5) START/STOP ENGINE (OPERABLE REMOTELY)<br>(6) CONTROL AIR-CONDITIONER (OPERABLE REMOTELY)<br>(7) SET DESTINATION FOR AUTOMATIC DRIVING (OPERABLE REMOTELY) |
| OWNER'S FAMILY | (1) ADD USER<br>(2) CHANGE VEHICLE SCENE<br>(6) CONTROL AIR-CONDITIONER (OPERABLE REMOTELY)<br>(7) SET DESTINATION FOR AUTOMATIC DRIVING (OPERABLE REMOTELY) |
| TEMPORARY USER (E.G., OWNER'S FRIEND) | NONE |
| WORKER (E.G., MECHANIC) | NONE |

FIG. 3

DRIVING SCENE (OWNER: DRIVER, TEMPORARY USER: PASSENGER)

| USER | PERMITTED OPERATION |
|---|---|
| OWNER | (1) ADD USER<br>(2) CHANGE VEHICLE SCENE<br>(3) ADD/DELETE DELIVERED APPLICATION<br>(4) LOCK/UNLOCK DOOR, OPEN/CLOSE SLIDING DOOR<br>(5) START/STOP ENGINE (OPERABLE REMOTELY)<br>(6) CONTROL AIR-CONDITIONER (OPERABLE REMOTELY)<br>(7) SET DESTINATION FOR AUTOMATIC DRIVING (OPERABLE REMOTELY) |
| OWNER'S FAMILY | (1) ADD USER |
| TEMPORARY USER (E.G., OWNER'S FRIEND) | (4) LOCK/UNLOCK DOOR, OPEN/CLOSE SLIDING DOOR<br>(6) CONTROL AIR-CONDITIONER (OPERABLE REMOTELY) |
| WORKER (E.G., MECHANIC) | NONE |

FIG. 4

DRIVING SCENE (TEMPORARY USER: DRIVER, : NO PASSENGER)

| USER | PERMITTED OPERATION |
|---|---|
| OWNER | (1) ADD USER<br>(3) ADD/DELETE DELIVERED APPLICATION |
| OWNER'S FAMILY | (1) ADD USER |
| TEMPORARY USER<br>(E.G., OWNER'S FRIEND) | (1) ADD USER<br>(2) CHANGE VEHICLE SCENE<br>(4) LOCK/UNLOCK DOOR, OPEN/CLOSE SLIDING DOOR<br>(5) START/STOP ENGINE (OPERABLE REMOTELY)<br>(6) CONTROL AIR-CONDITIONER (OPERABLE REMOTELY)<br>(7) SET DESTINATION FOR AUTOMATIC DRIVING<br>(OPERABLE REMOTELY) |
| WORKER<br>(E.G., MECHANIC) | NONE |

FIG. 5

INSPECTION AND MAINTENANCE SCENE

| USER | PERMITTED OPERATION |
|---|---|
| OWNER | (1) ADD USER |
| OWNER'S FAMILY | (1) ADD USER |
| TEMPORARY USER (E.G., OWNER'S FRIEND) | NONE |
| WORKER (E.G., MECHANIC) | (2) CHANGE VEHICLE SCENE<br>(4) LOCK/UNLOCK DOOR, OPEN/CLOSE SLIDING DOOR (OPERABLE REMOTELY)<br>(5) START/STOP ENGINE (OPERABLE REMOTELY)<br>(6) CONTROL AIR-CONDITIONER (OPERABLE REMOTELY)<br>(7) SET DESTINATION FOR AUTOMATIC DRIVING (OPERABLE REMOTELY)<br>(8) INSPECT AND MAINTAIN |

FIG. 9

```
YOUR PERMITTED/PROHIBITED OPERATION IS CHANGED

<CHANGED FROM PERMITTED TO PROHIBITED>
NONE

<CHANGED FROM PROHIBITED TO PERMITTED>
ADD USER
CHANGE VEHICLE SCENE
LOCK/UNLOCK DOOR, OPEN/CLOSE SLIDING DOOR
START/STOP ENGINE (OPERABLE REMOTELY)
CONTROL AIR-CONDITIONER (OPERABLE REMOTELY)
SET DESTINATION FOR AUTOMATIC DRIVING (OPERABLE REMOTELY)
```

FIG. 10

```
YOUR PERMITTED/PROHIBITED OPERATION IS CHANGED

<CHANGED FROM PERMITTED TO PROHIBITED>
CHANGE VEHICLE SCENE
ADD/DELETE DELIVERED APPLICATION
LOCK/UNLOCK DOOR, OPEN/CLOSE SLIDING DOOR
START/STOP ENGINE (OPERABLE REMOTELY)
CONTROL AIR-CONDITIONER (OPERABLE REMOTELY)
SET DESTINATION FOR AUTOMATIC DRIVING (OPERABLE REMOTELY)

<CHANGED FROM PROHIBITED TO PERMITTED>
NONE
```

FIG. 11

```
TERMINAL UNPERMITTED TO CHANGE VEHICLE SCENE IS
NOW REQUESTING TO CHANGE VEHICLE SCENE.
DO YOU APPROVE?

YES                      NO
```

VEHICULAR APPARATUS, VEHICULAR SYSTEM, AND USER AUTHENTICATION MANAGEMENT PROGRAM PRODUCT

CROSS REFERENCE TO RELATED APPLICATION

The present application claims the benefit of priority from Japanese Patent Application No. 2020-165364 filed on Sep. 30, 2020. The entire disclosure of the above application is incorporated herein by reference.

TECHNICAL FIELD

The present disclosure relates to a vehicular apparatus, a vehicular system, and a user authentication management program product.

BACKGROUND

There may be a case where several users for a vehicle are existing around or inside the vehicle. In such a case, the behavior of one user may threaten the safety and security of another user, or multiple users may perform conflicting operations at the same time, causing confusion to the users of the vehicle. For example, while a worker such as a mechanic inspects and maintains a vehicle, the owner of the vehicle may remotely start the engine. Such a case may threaten the safety and security of the worker. For example, if a passenger operates to stop the engine while the owner is driving, the engine suddenly stops and the vehicle gets stuck.

Unlike a known physical key or key fob, a smartphone key or biometrics authentication has the advantage of being able to register any number of users or devices. However, it is necessary to predetermine a rational response procedure as a countermeasure when a plurality of users perform operations concurrently.

SUMMARY

According to an example of the present disclosure, a vehicular apparatus is provided as follows. A user of a vehicle is authenticated. In response to authenticating the user, a user management table is referred to. The user management table manages an association between the user and a permitted or prohibited operation of the user for each vehicle scene. The permitted or prohibited operation of the user authenticated is thereby specified to provide a specified result. An application corresponding to the permitted or prohibited operation of the user is notified of the specified result to manage the operation of the user.

BRIEF DESCRIPTION OF DRAWINGS

The objects, features, and advantages of the present disclosure will become more apparent from the following detailed description made with reference to the accompanying drawings. In the drawings:

FIG. 1 is a diagram showing an overall configuration of one embodiment;
FIG. 2 is a diagram showing a user management table (No. 1);
FIG. 3 is a diagram showing a user management table (No. 2);
FIG. 4 is a diagram showing a user management table (No. 3);
FIG. 5 is a diagram showing a user management table (No. 4);
FIG. 9 is a diagram showing a display screen for notifying of permission/prohibition of operation (No. 1);
FIG. 10 is a diagram showing a display screen for notifying of permission/prohibition of operations (No. 2);
and
FIG. 11 is a diagram showing a display screen for notifying of a vehicle scene change request.

DETAILED DESCRIPTION

Figure 6:
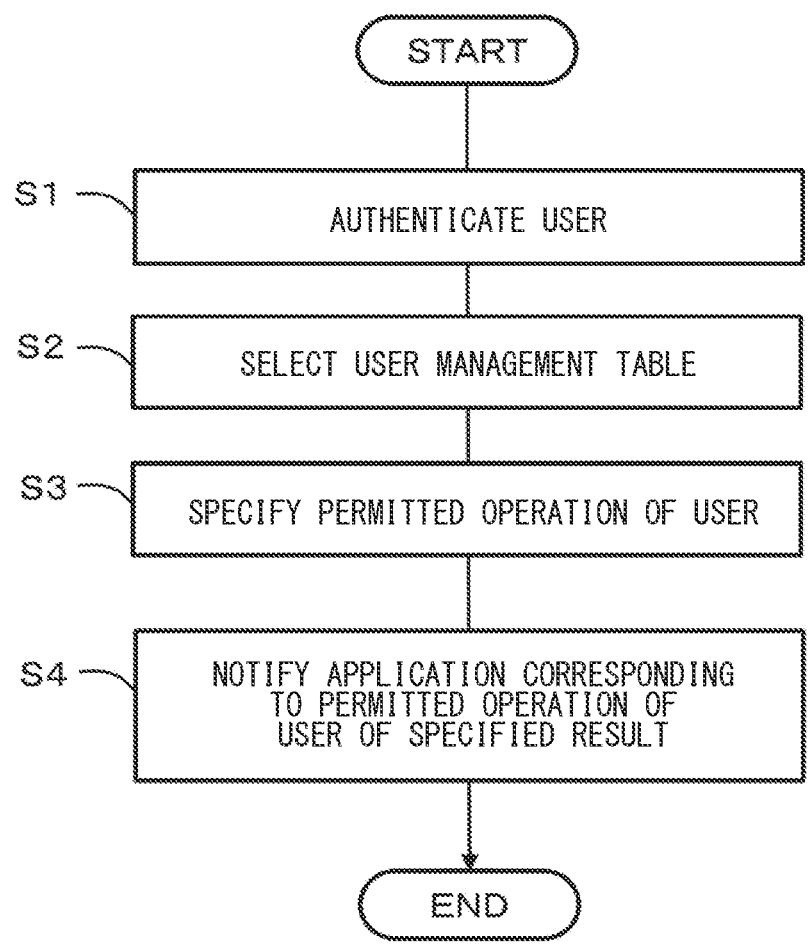
FIG. 6 is a flowchart (No. 1)

Hereinafter, an embodiment of the present disclosure will be described with reference to the drawings. A vehicular system is configured to authenticate users of a vehicle existing around or inside the vehicle and to permit or prohibit various operations of the authenticated users. The users include, for example, (i) the owner who is the owner of the vehicle, (ii) owners family such as owners spouse, parents, and children; (iii) a temporary user who temporarily uses the vehicle, which is a friend of the owner, etc., or (iv) a worker such as a mechanic who inspects and maintains the vehicle. The various operations of the user include; for example; starting/stopping the engine, adjusting the air conditioner, and setting a destination for automatic driving. The user may be a user other than those illustrated, and various operations of the user may be operations other than those illustrated. Further, in the present embodiment, it is assumed that a user, who is existing around the vehicle or in the vehicle, carries or holds a mobile communication terminal. An example of a case is illustrated where a user who carries the mobile communication terminal is authenticated by authenticating the mobile communication terminal.

As shown in FIG. 1, the vehicular system 1 includes an authentication device 2 and an ECU 3 (i.e., Electronic Control Unit 3). The ECU 3 corresponds to a vehicular apparatus. Further, the vehicular system may be provided as a system including the ECU 3 and a mobile communication terminal 4, which will be described below, held by a user.

The authentication device 2 has a data communication function compliant with wireless communication standards such as BLE (Bluetooth Low Energy), UWB (Ultra Wide Band), and NFC (Near Field Communication): data communication is performed with the mobile communication terminal 4 existing around the vehicle or in the vehicle. The authentication device 2 establishes a communication link with the mobile communication terminal 4 when the mobile communication terminal 4 enters the communication range. When the terminal identification information transmitted from the mobile communication terminal 4 is received, the received terminal identification information is verified with the terminal identification information registered in advance. The mobile communication terminal 4 is thereby authenticated, and the authentication result is transmitted to the ECU 3, If the terminal identification information transmitted from the mobile communication terminal 4 matches the terminal identification information registered in advance, the authentication device 2 authenticates that the mobile communication terminal 4 is a registered mobile communication terminal.

The ECU 3 includes a controller. As an example of the present embodiment, the controller is configured as a microcomputer including a CPU (Central Processing Unit), a ROM (Read Only Memory), a RAM (Random Access Memory), etc., and executing various control programs stored in a non-transitory tangible storage medium. The ECU 3 includes a user authentication management unit 5 that manages the authentication status of the vehicle user as one of various processes. The user authentication management unit 5 includes a user authentication unit 5*a*, a memory storing a user management table 5*b*, an operation specification unit 5*c*, and an operation management unit 5*d* for respective functions.

When the user authentication unit 5*a* receives an authentication result transmitted from the authentication device 2, the user authentication unit 5*a* authenticates the user corresponding to the mobile communication terminal 4 based on the authentication result. The user corresponding to the mobile communication terminal 4 is a user who carries or holds the mobile communication terminal 4. That is, if the terminal identification information transmitted from the mobile communication terminal 4 matches the terminal identification information of the owner registered in advance, the user authentication unit 5*a* specifies that the owner of the mobile communication terminal 4 is the owner, and specifies that the owner is existing around or inside the vehicle. If the terminal identification information transmitted from the mobile communication terminal 4 matches the terminal identification information of the owner's family registered in advance, the user authentication unit 5*a* specifies that the owner of the mobile communication terminal 4 is the owner's family, and specifies that the owner's family is existing around or in the vehicle.

If the terminal identification information transmitted from the mobile communication terminal 4 matches the terminal identification information of the temporary user registered in advance, the user authentication unit 5*a* specifies that the owner of the mobile communication terminal 4 is the temporary user, and specifies that that the temporary user is existing around or inside the vehicle. If the terminal identification information transmitted from the mobile communication terminal 4 matches the terminal identification information of the worker registered in advance, the user authentication unit 5*a* specifies that the owner of the mobile communication terminal 4 is the worker, and specifies that the worker is existing around or inside the vehicle.

In this case, when there are a plurality of users around the vehicle or in the vehicle, the user authentication unit 5*a* authenticates the plurality of users concurrently and specifies that there are a plurality of users around the vehicle or in the vehicle.

In the present embodiment, as described above, the case is illustrated which authenticates the user by authenticating the mobile communication terminal 4. However, the user may be authenticated by a method other than authenticating the mobile communication terminal 4. For example, a camera may be used as the authentication device 2, the user's face may be imaged by the camera; and the users face image may be authenticated with a pre-registered face image to authenticate the user. For example, a reader may be used as the authentication device 2, the card information of the card held by the user may be read by the reader, and the card information may be authenticated with the card information registered in advance to authenticate the user. For example, a measuring device that measures biometric information may be used as the authentication device 2, the biometric information of the user may be read by the measuring device, and the biometric information of the user may be authenticated with the pre-registered biometric information to authenticate the user. Biological information includes, for example, fingerprints, irises in the eyes, veins such as fingers and palms, and voiceprints. Further, the user may be authenticated by combining some of these methods.

The user management table 5*b* is a table that manages the association between the user of the vehicle and the permitted operation of the user for each vehicle scene. The vehicle scene is classified into, for example, a driving scene and an inspection and maintenance scene; the driving scene is classified, for example, by a combination of occupants. The driving scene includes the initial setting scene corresponding to the life cycle. The inspection and maintenance scene is a scene in which (i) the operation of a worker such as a mechanic who is a user permitted to inspect and maintain the vehicle is permitted and (ii) the operation of another user is prohibited.

For example, as a driving scene, if the owner is the driver and the owners family is a passenger, as shown in FIG. 2, the permitted operations of the owner and the owners family are set. In the management table illustrated in FIG. 2, for example, operations such as "add user" and "change vehicle scene" are permitted for both the owner and the owner's family. Further, in the management table illustrated in FIG. 2, for example, operations such as "lock/unlock door, open/close sliding door" and "start/stop engine" are permitted for the owner, but not for the owners family. That is, for example; even if a passenger performs an operation to stope engine while the owner is driving; the operation to stop engine performed by the passenger is not permitted. Therefore, the engine does not suddenly stop and the vehicle does not get stuck.

For example, as a driving scene, if the owner is the driver and the temporary user is a passenger, as shown in FIG. 3, the permitted operations of the owner, the owner's family, and the temporary user are set. For example, suppose a case where in a driving scene, the temporary user is the driver and there is no passenger. In such a case, as shown in FIG. 4, the permitted operations of the owner, the owner's family, and the temporary user are set.

Further, in the case of an inspection and maintenance scene, as shown in FIG. 5, operations permitted by the owner, the owner's family, and the worker are set. In the management table illustrated in FIG. 5, for example, operations such as "lock/unlock door, open/close sliding door" and "start/stop engine" are permitted for the worker, but not for the owner and the owners family. That is, even if the owner remotely performs the operation to start engine while the operator is inspecting and servicing the vehicle, the operation to start engine performed by the owner is not permitted. Therefore, the safety and security of the worker is not threatened.

The classification of the vehicle scene may be a classification other than those illustrated. For example, it can be classified into a daytime driving scene and a nighttime driving scene depending on the time of day. It can be classified into a driving scene on general roads and a driving scene on motorways. The permitted work contents may be classified according to the technical skills of the worker. In addition, the user classification may be a classification other than those illustrated. For example, the owner's family is classified into (i) spouse and (ii) parent or child. The temporary user may be classified according to age, years of driving experience, and the like.

When the user is authenticated by the user authentication unit 5*a*, the operation specification unit 5*c* refers to the user management table 5*b* and specifies the permitted operation of the authenticated user. When the operation specification unit 5*c* specifies the permitted operation of the authenticated user, the operation management unit 5*d* notifies the application 6 corresponding to the permitted operation of the user of the specified result, managing the operation of the user. An application is software that runs on hardware to achieve a particular function. When the operation management unit 5d notifies the application 6 of the specified result, the application 6 selects whether or not to run according to the specified result. If the specified result notified from the operation management unit 5d indicates that the users operation is permitted, the application 6 selects to run and transmits the control signal to the in-vehicle device 8 or the display device 9 through the vehicle network 7. The in-vehicle device 8 is, for example, an ECU that runs the function of the application 6, an engine ECU that controls engine start/stop, an air conditioner ECU that controls air conditioner adjustment, a navigation ECU that controls automatic driving destination setting, or the like. The display device 9 is a center display, a meter, a head-up display, or the like.

When the user authentication unit 5a authenticates that the users is the owner and the owner's family, for example, the operation specification unit 5c refers to the user management table 5b illustrated in FIG. 2 and specifies the permitted operations of the authenticated users. The operation management unit 5d notifies the application 6 corresponding to the permitted operation of the users of the specified result. In the user management table 5b illustrated in FIG. 2, for example, the operation of "add user" is permitted to both the owner and the owner's family. Therefore, when both the owner and the owner's family perform the operation to "add user", the operation management unit 5d transmits a control signal to the display device 9, and displays a display screen for adding a user on the display device 9. That is, both the owner and the owner's family can perform an operation to add a user according to the display screen displayed on the display device 9. In addition, both the owner and the owners family may operate their own mobile communication terminal 4 to enable an operation to add a user.

Further, in the user management table 5b illustrated in FIG. 2, for example, the operation to "start/stop engine" is permitted for the owner but not for the owner's family. Therefore, when the owner performs the operation to "start/stop engine", the operation management unit 5d transmits a control signal to the in-vehicle device 8 that controls the engine start/stop, and executes the engine start/stop control. However, even if the owner's family performs the operation to "start/stop engine start", the control signal is not transmitted to the in-vehicle device 8 that controls the engine start/stop, and the engine start/stop control is not executed. That is, the owner can start/stop the engine, but the owner's family cannot start/stop the engine.

Figure 7:
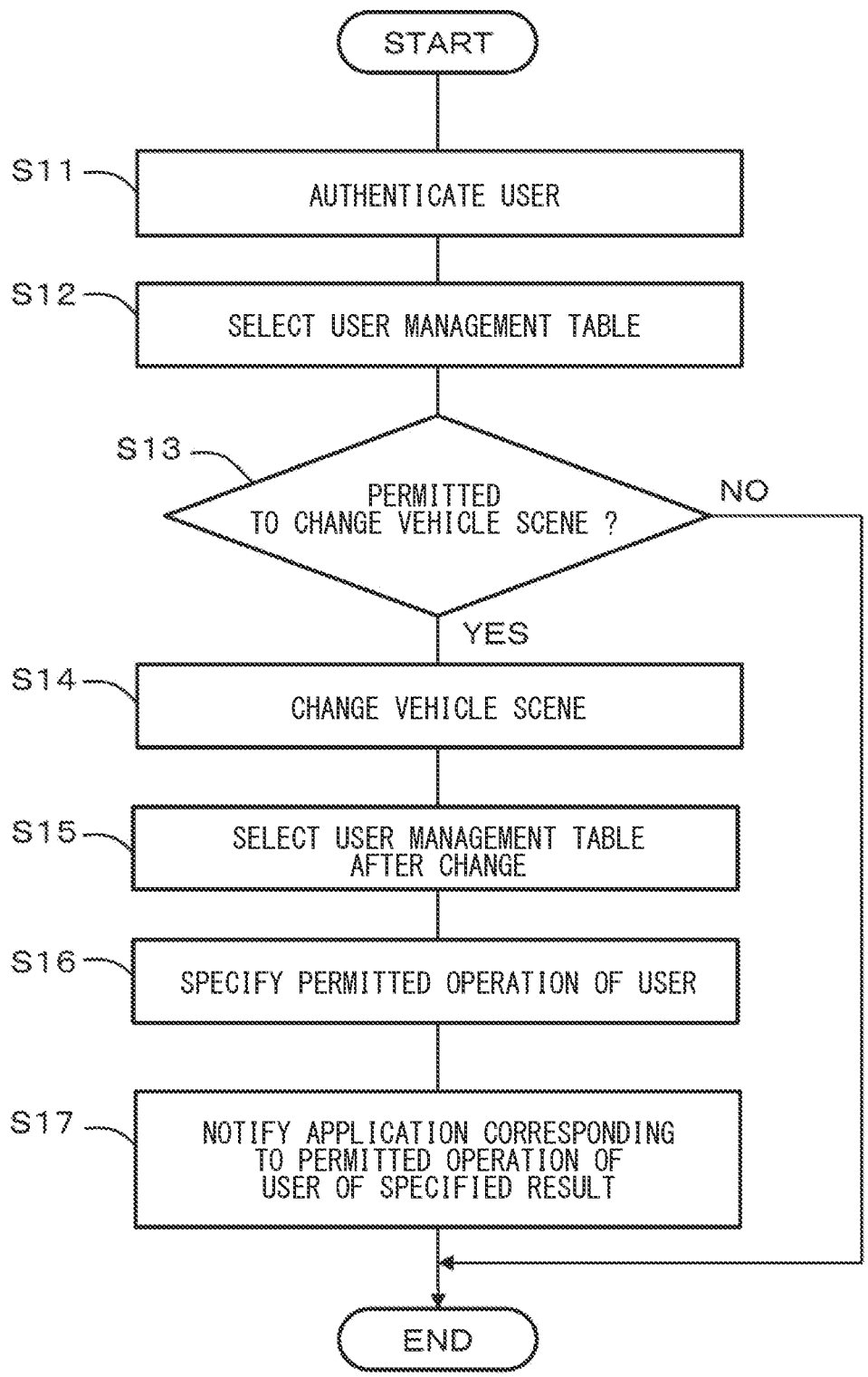
FIG. 7 is a flowchart (No. 2)
Figure 8:
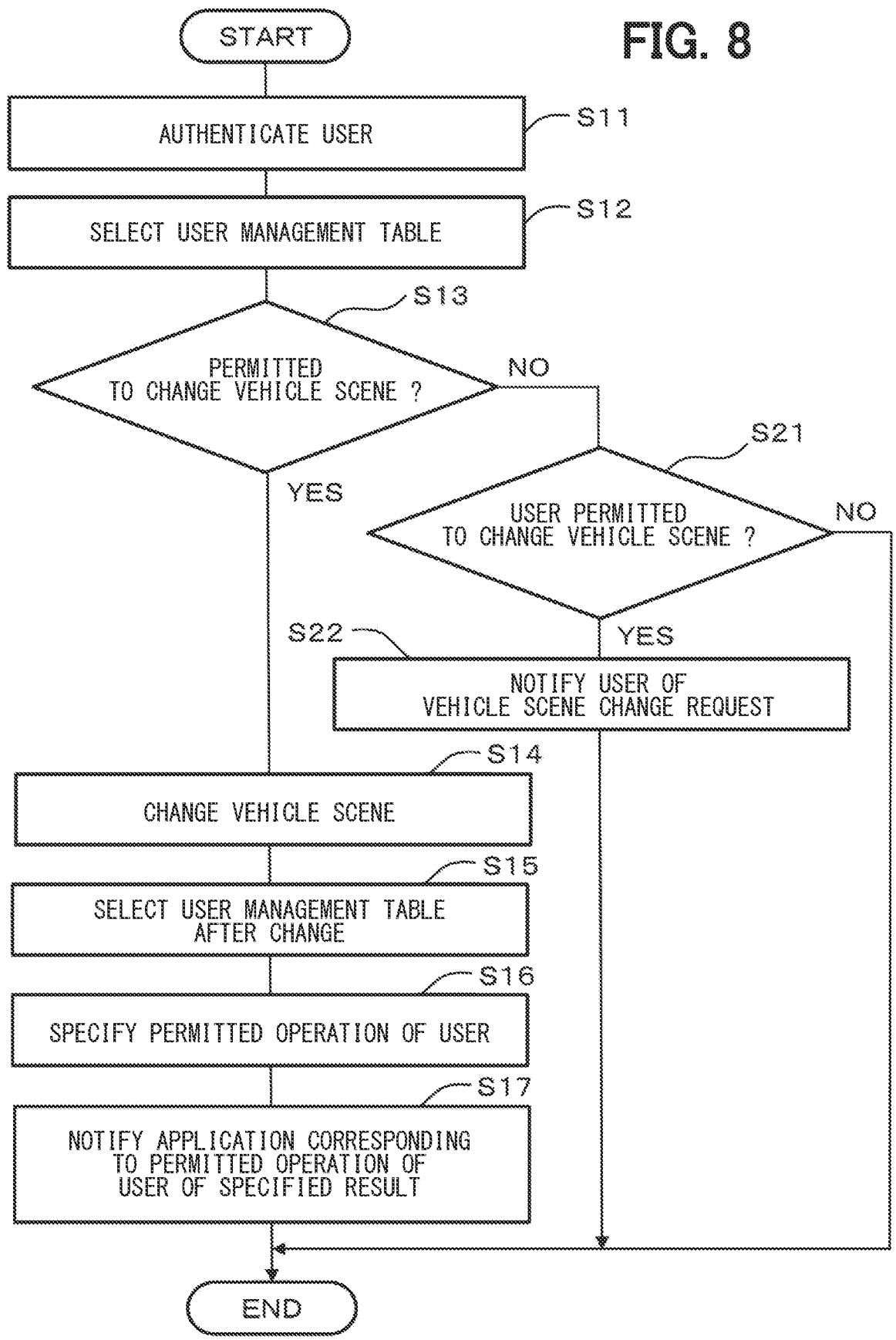
FIG. 8 is a flowchart (No. 3)

The following will describe an operation of the above configuration with reference to FIG. 6 to FIG. 11. The user authentication management unit 5 executes the following process by executing the user authentication management program. The processes executed by the user authentication management unit 5 include (1) an initial operation process, (2) a vehicle scene change request notification process (with change request not issued), and (3) a vehicle scene change request notification process (with change request issued).

(1) Initial Operation Process

With the start of the initial operation process, the user authentication management unit 5 causes the user authentication unit 5a to authenticate the users existing around the vehicle or in the vehicle based on the authentication result transmitted from the authentication device 2 (S1 corresponding to a user authenticating step), and selects the corresponding user management table 5b according to the authentication result (S2). When the user authentication management unit 5 selects the user management table 5b, the user authentication management unit 5 refers to the selected user management table 5b and specifies the permitted operations of the authenticated user (S3 corresponding to an operation specifying step). The user authentication management unit 5 (i) notifies the application 6 corresponding to the permitted operation of the user of the specified result, (ii) manages the operation of the user (S4 corresponding to an operation managing step), and (iii) ends the initial operation process.

That is, suppose a case where, for example, the user is the owner and the owner's family and the user authentication management unit 5 authenticates the owner and the owners family. In such a case, the user management table 5b shown in FIG. 2 is selected, the permitted operations of the owner and the owner's family are specified, and the specified result is notified to the corresponding application 6. In this state, for example, both the owner and the owner's family can perform an operation to add a user. Further, for example, the owner can operate the engine start/stop, but the owner's family cannot operate the engine start/stop.

(2) Notification Process of Vehicle Scene Change Request (with Change Request not Notified)

When the vehicle scene change request is notified, the user authentication management unit 5 starts the notification process of the vehicle scene change request. With the start of the notification process of the vehicle scene change request, the user authentication management unit 5 causes the user authentication unit 5a to authenticate the users existing around the vehicle or in the vehicle based on the authentication result transmitted from the authentication device 2 (S11). The corresponding user management table 5b is selected according to the authentication result (S12).

When the user authentication management unit 5 selects the user management table 5b, the user authentication management unit 5 refers to the selected user management table 5b, and determines whether or not the request source of the vehicle scene change request is a user who is permitted to change the vehicle scene (S13), When the user authentication management unit 5 determines that the user is permitted to change the vehicle scene (S13: YES), the user authentication management unit 5 changes the vehicle scene (S14) and selects the user management table 5b after the change (S15).

When the user authentication management unit 5 selects the changed user management table 5b, the user authentication management unit 5 refers to the selected user management table 5b and specifies the permitted operation of the authenticated user (S16). The user authentication management unit 5 notifies the application 6 corresponding to the permitted operation of the user of the specified result, manages the operation of the user (S17), and ends the notification process of the vehicle scene change request. If the user authentication management unit 5 determines that the user is not permitted to change the vehicle scene (S13: NO), the user authentication management unit 5 ends the notification process of the vehicle scene change request without changing the vehicle scene.

That is, for example, when the owner lends the vehicle to a temporary user, the operation is as follows. The user authentication management unit 5 selects, for example, the user management table 5b illustrated in FIG. 2, and the owner operates the vehicle scene change. The user authentication management unit 5 then authenticates the mobile communication terminal 4 carried by the owner, and authenticates the owner. As a result, the vehicle scene is changed from the user management table 5*b* illustrated in FIG. 2 to the user management table 5*b* illustrated in FIG. 4. After that, the owner will not be able to start/stop the engine, but the temporary user will be able to start/stop the engine.

In this case, the user authentication management unit 5 causes the owner's mobile communication terminal 4 to display a display screen notifying of the permission/prohibition of the operation. That is, by checking the display screen displayed on the mobile communication terminal 4, the owner can grasp the operation changed from permission to prohibition and the operation changed from prohibition to permission. It is possible to grasp that the operation of starting/stopping the engine has become impossible. At the same time, the user authentication management unit 5 causes the temporary user's mobile communication terminal 4 to display the display screen shown in FIG. 9 as a display screen for notifying of the permission/prohibition of the operation. That is, by checking the display screen displayed on his/her mobile communication terminal 4, the temporary user can grasp the operation changed from permission to prohibition and the operation changed from prohibition to permission. It is possible to grasp that the operation of starting and stopping the engine has become possible. Note that the user authentication management unit 5 causes the mobile communication terminal 4 of the owner or the temporary user to display the display screen for notifying of the permission/prohibition of the operation in this way. In addition, the display device 9 may display a display screen for notifying of the equivalent contents.

In addition, when the owner requests an inspection and maintenance of the vehicle, the operation is as follows. The user authentication management unit 5 selects, for example, the user management table 5*b* illustrated in FIG. 2, and the owner drives to the vehicle maintenance site. When a worker existing around the vehicle operates the vehicle scene change, the mobile communication terminal 4 carried by the worker is authenticated. By authenticating the worker, the vehicle scene is changed from the user management table 5*b* illustrated in FIG. 2 to the user management table 5*b* illustrated in FIG. 5. After that, the owner will not be able to start/stop the engine, but the operator will be able to start/stop the engine. Also in this case, the user authentication management unit 5 causes the owner's mobile communication terminal 4 to display the display screen shown in FIG. 10 as a display screen for notifying of the permission/prohibition of the operation.

(3) Notification Process of Vehicle Scene Change Request (with Change Request Notified)

When the user authentication management unit 5 determines that the user is not permitted to change the vehicle scene (S13: NO), the user authentication management unit 5 determines whether or not there is a user who is permitted to change the vehicle scene (S21). When the user authentication management unit 5 determines that there is a user who is permitted to change the vehicle scene (S21: YES), the user authentication management unit 5 notifies the user who is permitted to change the vehicle scene of the vehicle scene change request (S22), and ends the notification process of the vehicle scene change request. In this case, the user authentication management unit 5 notifies the user who is permitted to change the vehicle scene of the display screen shown in FIG. 11 as a display screen for notifying of the vehicle scene change request.

That is, the user authentication management unit 5 selects, for example, the user management table 5*b* illustrated in FIG. 2, and an operator existing around the vehicle operates the vehicle scene change. The operation of changing the vehicle scene from the worker is however not permitted. Therefore, the display screen for notifying of the vehicle scene change request is displayed on the mobile communication terminal 4 of the owner or the mobile communication terminal 4 of the owner's family who is permitted to change the vehicle scene. That is, the owner and the owner's family can check the display screen displayed on their mobile communication terminal 4, and be enabled to grasp the vehicle scene change request and select whether to approve or reject the vehicle scene change request. In addition to displaying the display screen for notifying of the vehicle scene change request on the owner or the owner's family's mobile communication terminal 4, the user authentication management unit 5 may display a display screen for notifying the equivalent contents in the display device 9.

In the above, as the user management table 5*b*, a table that manages the association between the vehicle user and the permitted operation of the user for each vehicle scene is illustrated. However, it may be a table that manages the association between the vehicle user and the prohibited operation of the user for each vehicle scene. Further, (i) a table that manages the association with permitted operations and (ii) a table that manages the association with prohibited operations may be used together.

The present embodiment as described above provides the following technical effects. In the ECU 3, the association between the user and the permitted operation of the user is managed by the user management table 5*b* for each vehicle scene. When the user is authenticated, the user management table 5*b* is referred to, and the permitted operation of the authenticated user is specified. Then, the specified result is notified to the application 6 corresponding to the permitted or prohibited operation of the user, and the operation of the user is managed. A new association between the user to be added and the permitted or prohibited operation of the user is newly added to the user management table 5*b*, As a result, it is possible to appropriately respond when adding users, and it is possible to improve convenience.

When the vehicle scene change request is notified, the user management table 5*b* is referred to and the vehicle scene change request is notified. The vehicle scene is changed when the request source of the vehicle scene change request is a user who is permitted to change the vehicle scene. A user who is permitted to change the vehicle scene, that is, a user who is authorized to change the vehicle scene can freely change the vehicle scene, and the convenience can be further enhanced.

Further, if the request source of the vehicle scene change request is a user who is not permitted to change the vehicle scene, the vehicle scene is not changed. It is possible to prevent a user who is unpermitted to change the vehicle scene (i.e., a user who is not authorized to change the vehicle scene) from changing the vehicle scene, and can ensure safety, security, and security.

Further, if the request source of the vehicle scene change request is a user who is not permitted to change the vehicle scene, the vehicle scene change request is notified to the user who is permitted to change the vehicle scene. This configuration can avoid changing the vehicle scene by users who are not authorized to change the vehicle scene. At the same time, instead of a user who is not authorized to change the vehicle scene, a user who is authorized to change the vehicle scene can freely change the vehicle scene. Convenience can be further enhanced.

In addition, the user is authenticated by authenticating the mobile communication terminal 4. This can be achieved by simply improving existing software without adding new hardware without using a camera that captures the user's face or a reader that reads the card information of the card held by the user.

While the present disclosure has been described based on the embodiment, the present disclosure is not limited to the embodiment or structure described herein. The present disclosure incorporates various modifications and variations within the scope of equivalents. Additionally, various combinations and configurations, as well as other combinations and configurations including more, less, or only a single element, are within the scope and spirit of the present disclosure.

The controller (i.e., the controller included in the ECU 3) and methods described in the present disclosure in the above embodiment may be implemented by one or more special-purpose computers. Such computers may be created (i) by configuring (a) a memory and a processor programmed to execute one or more particular functions embodied in computer programs, or (ii) by configuring (b) a processor provided by one or more special purpose hardware logic circuits, or (iii) by configuring a combination of (a) a memory and a processor programmed to execute one or more particular functions embodied in computer programs and (b) a processor provided by one or more special purpose hardware logic circuits.

For reference to further explain features of the present disclosure, the description is added as follows.

There may be a case where several users for a vehicle are existing around or inside the vehicle. In such a case, the behavior of one user may threaten the safety and security of another user; or multiple users may perform conflicting operations at the same time, causing confusion to the users of the vehicle. For example, while a worker such as a mechanic inspects and maintains a vehicle, the owner of the vehicle may remotely start the engine. Such a case may threaten the safety and security of the worker. For example, if a passenger operates to stop the engine while the owner is driving, the engine suddenly stops and the vehicle gets stuck.

Unlike a known physical key or key fob, a smartphone key or biometrics authentication has the advantage of being able to register any number of users or devices. However, it is necessary to predetermine a rational response procedure as a countermeasure when a plurality of users perform operations concurrently. For example, there is proposed a configuration in which an access control policy according to a life cycle is managed for each control target data.

However, such a configuration may provide a problem that it is inferior in convenience because it takes time to change the access control policy for each control target data when a new vehicle user is added.

It is thus desired to provide a vehicular apparatus, a vehicular system, and a user authentication management program product, which can appropriately respond to the addition of a new vehicle user and enhance the convenience.

Aspects of the present disclosure described herein are set forth in the following clauses.

According to a first aspect of the present disclosure, a vehicular apparatus is provided with a memory configured to store a user management table that is configured to manage an association between a user of the vehicle and a permitted or prohibited operation of the user for each vehicle scene. The vehicular apparatus includes a user authentication unit, an operation specification unit, and an operation management unit. The user authentication unit is configured to authenticate the user of the vehicle. The operation specification unit is configured to refer to the user management table in response to the user authentication unit authenticating the user, and specify the permitted or prohibited operation of the user who is authenticated, providing a specified result. The operation management unit is configured to notify an application corresponding to the permitted or prohibited operation of the user of the specified result and manage the operation of the user.

Further, according to a second aspect of the present disclosure; an apparatus installable to a vehicular is provided with a first memory, a second memory, and a processor communicably coupled to the first memory and the second memory. The first memory is configured to store a user management table that is configured to manage an association between a user of the vehicle and a permitted or prohibited operation of the user with respect to each vehicle scene. The second memory is configure to store instructions. The processor is configured, by executing the instructions with the apparatus installed in the vehicle; to: (i) authenticate the user of the vehicle; (ii) refer to a user management table in response to the user being authenticated; (iii) specify the permitted or prohibited operation of the user authenticated, providing a specified result; and (iv) notify an application corresponding to the permitted or prohibited operation of the user authenticated of the specified result to manage the operation of the user authenticated.

Under such a configuration according to the first or second aspect of the present disclosure, the association between the user and the permitted or prohibited operation of the user is managed by the user management table for each vehicle scene. When a user is authenticated, the user management table is referred to to specify the permitted or prohibited operation of the authenticated user. Then, the specified result is notified to the application corresponding to the permitted or prohibited operation of the user, and the operation of the user is managed. A new association between the user to be added and the permitted or prohibited operation of the added user is newly added to the user management table. As a result, it is possible to appropriately respond when adding users, and it is possible to improve convenience.

What is claimed is:

1. A vehicular apparatus to a vehicle, the vehicular apparatus comprising:
   a memory storing a user management table configured to manage an association between a user of the vehicle and a permitted or prohibited operation of the user with respect to each vehicle scene of a plurality of vehicle scenes;
   a user authentication unit configured to authenticate the user of the vehicle;
   an operation specification unit configured to
   refer to the user management table in response to the user being authenticated, and
   specify the permitted or prohibited operation of the authenticated user, providing a specified result indicating the permitted or prohibited operation of the authenticated user; and
   an operation management unit configured to notify an application corresponding to the permitted or prohibited operation of the authenticated user of the specified result to manage the operation of the authenticated user;
   wherein the operation management unit adds a new association to the user management table stored in the memory between a new user and a permitted or prohibited operation of the new user with respect to each vehicle scene of the plurality of vehicle scenes, the adding of the new association to the user management table being included in the permitted operation of the authenticated user;

wherein the plurality of vehicle scenes includes a driving scene classified by driving the vehicle while having a combination of occupants within the vehicle; and wherein the adding of the new association is permitted to only a specific authenticated user, the specific authenticated user including at least one of an owner of the vehicle or a family member of the owner of the vehicle.

2. The vehicular apparatus according to claim 1, wherein:
the user authentication unit is further configured to authenticate a plurality of users; and
the user management table is configured to manage the association between one of the plurality of authenticated users and the permitted or prohibited operation of the one of the plurality of authenticated users.

3. The vehicular apparatus according to claim 1, wherein:
the operation management unit is further configured to
refer to the user management table in response to receiving a vehicle scene change request, and
change the vehicle scene in response to a request source of the vehicle scene change request corresponding to a user who is permitted to change the vehicle scene or not prohibited from changing the vehicle scene.

4. The vehicular apparatus according to claim 3, wherein:
the operation management unit is further configured not to change the vehicle scene in response to the request source of the vehicle scene change request corresponding to a user who is prohibited from changing the vehicle scene or not permitted to change the vehicle scene.

5. The vehicular apparatus according to claim 4, wherein:
the operation management unit is further configured to notify the user who is permitted to change the vehicle scene or not prohibited from changing the vehicle scene, of the vehicle scene change request, in cases of not changing the vehicle scene in response to the request source of the vehicle scene change request corresponding to the user who is prohibited from changing the vehicle scene or not permitted to change the vehicle scene.

6. The vehicular apparatus according to claim 1, wherein:
the user management table is further configured to manage an initial setting scene corresponding to a life cycle as one of the plurality of vehicle scenes.

7. The vehicular apparatus according to claim 1, wherein:
the user management table is further configured to manage an inspection and maintenance scene as one of the plurality of vehicle scenes; and
the inspection and maintenance scene is configured to
permit the operation of a user who is permitted to inspect and maintain the vehicle, and
prohibit the operation of other than the user who is permitted to inspect and maintain the vehicle.

8. The vehicular apparatus according to claim 1, wherein:
the user authentication unit is further configured to
include a function of communicating with a mobile communication terminal, and
authenticate a user who holds the mobile communication terminal by authenticating the mobile communication terminal.

9. A vehicular system, comprising:
a mobile communication terminal held by a user of a vehicle; and
a vehicular apparatus to the vehicle, the vehicular apparatus configured to communicate with the mobile communication terminal,
wherein the vehicular apparatus comprises:
a memory storing a user management table configured to manage an association between the user of the vehicle and a permitted or prohibited operation of the user with respect to each vehicle scene of a plurality of vehicle scenes;
a user authentication unit configured to authenticate the user of the vehicle;
an operation specification unit configured to
refer to the user management table in response to the user being authenticated, and
specify the permitted or prohibited operation of the authenticated user, providing a specified result indicating the permitted or prohibited operation of the authenticated user; and
an operation management unit configured to notify an application corresponding to the permitted or prohibited operation of the authenticated user of the specified result to manage the operation of the authenticated user;
wherein the operation management unit adds a new association to the user management table stored in the memory between a new user and a permitted or prohibited operation of the new user with respect to each vehicle scene of the plurality of vehicle scenes, the adding of the new association to the user management table being included in the permitted operation of the authenticated user;
wherein the plurality of vehicle scenes includes a driving scene classified by driving the vehicle while having a combination of occupants within the vehicle; and
wherein the adding of the new association is permitted to only a specific authenticated user, the specific authenticated user including at least one of an owner of the vehicle or a family member of the owner of the vehicle.

10. A user authentication management program product stored on a non-transitory computer readable storage medium and comprising instructions configured to, when executed by at least one processor, cause the at least one processor to:
authenticate a user of a vehicle;
refer to a user management table, which manages an association between the user of the vehicle and a permitted or prohibited operation of the user with respect to each vehicle scene of a plurality of vehicle scenes, in response to authenticating the user;
specify the permitted or prohibited operation of the authenticated user, providing a specified result indicating the permitted or prohibited operation of the authenticated user;
notify an application corresponding to the permitted or prohibited operation of the authenticated user of the specified result to manage the operation of the authenticated user; and
add a new association to the user management table between a new user and a permitted or prohibited operation of the new user with respect to each vehicle scene of the plurality of vehicle scenes, the adding of the new association to the user management table being included in the permitted operation of the authenticated user;
wherein the plurality of vehicle scenes includes a driving scene classified by driving the vehicle while having a combination of occupants within the vehicle; and wherein the adding of the new association is permitted to only a specific authenticated user, the specific authenticated user including at least one of an owner of the vehicle or a family member of the owner of the vehicle.

11. The vehicular apparatus according to claim 1, further comprising:
at least one processor communicably coupled to the memory, the at least one processor being configured to implement the user authentication unit, the operation specification unit, and the operation management unit.

12. The vehicular system according to claim 9, wherein:
the user authentication unit in the vehicular apparatus is further configured to authenticate the user who holds the mobile communication terminal by authenticating the mobile communication terminal.

* * * * *